Nov. 3, 1942.	R. TWYMAN	2,301,098
POWER TRANSMISSION
Filed Oct. 16, 1939
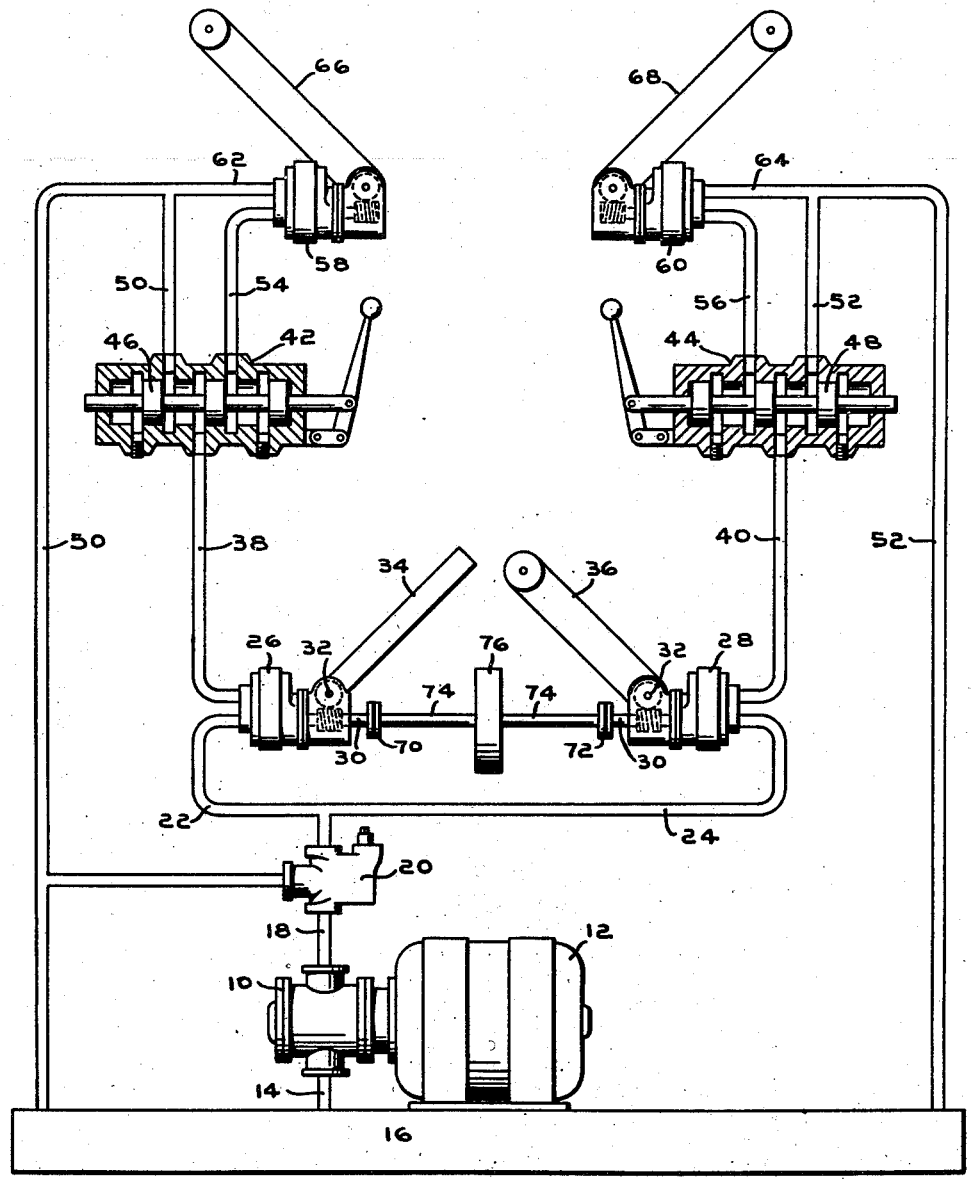
INVENTOR
L. RAYMOND TWYMAN
BY
ATTORNEY Patented Nov. 3, 1942

2,301,098

UNITED STATES PATENT OFFICE 2,301,098

POWER TRANSMISSION

L Raymond Twyman, Detroit, Mich., assignor to Vickers Incorporated, Detroit, Mich., a corporation of Michigan Application October 16, 1939, Serial No. 299,641

6 Claims. (Cl. 60—97)

This invention relates to power transmissions, particularly to those of the type comprising two or more fluid pressure energy translating devices, one of which may function as a pump and another as a fluid motor.

The invention is more particularly concerned with a power transmission of the type having a plurality of fluid motors driven from a common pump or other source of fluid pressure and wherein it is desired to maintain a predetermined speed ratio between the motors.

In machines of the type which have several sections to be driven, such, for example, as a combined rock crusher and sifter, it has been customary in the past to provide chain and sprocket drives extending from one section of the machine to the next. Where the various sections are considerably spaced from one another the chains become unduly long and are a constant source of danger and in many other ways are unsatisfactory driving means for the various sections of the machine. The use of hydraulic power transmission means in place of the chain and sprocket drives presents obvious advantages in the way of neatness and simplicity of the drive mechanism although it has heretofore been impractical due to the necessity of providing a separate pump for each fluid motor or at least providing a pump for each pair of motors utilized. It is well known that when two fluid motors are connected in parallel to a common pump that such a circuit acts as a differential gear delivering power to whichever of the motors happens to have the lightest load at any moment. This difficulty can be avoided when it is necessary to maintain a fixed speed ratio between two motors by connecting them in series with the pump. When motors are thus connected in series, the pressure load on the pump, however, is equal to the sum of the pressure loads on the motors, and for this reason it is impractical to utilize more than two motors in series.

It is an object of the present invention to provide a multiple drive system for delivering power to more than two sections of a machine wherein a common pump may be utilized for driving more than two fluid motors with a definite speed ratio between the motors and permitting free interchange of load between the various motors and the pump so that the full power of the pump may be divided up between the motors in any ratio which load conditions may demand at the moment.

In machines such as a combined rock crusher and sifter, many of the sections which require a correlated drive are belt-type conveyors which carry the crushed rock and sand from one point to another in the machine. These conveyors impose a very high load on the drive mechanism during starting of the conveyor, and where means are provided for selectively cutting in or out one or more of the conveyors, the high starting load imposes an abnormal load on the pump which is of momentary duration.

It is also an object to provide a transmission system of this character wherein inertia means are provided forming an energy reservoir which may be drawn upon by any one of the fluid motors for taking care of temporary peak loads which would otherwise overload the pump.

Further objects and advantages of the present invention will be apparent from the following description, reference being had to the accompanying drawing wherein a preferred form of the present invention is clearly shown.

In the drawing the single figure is a diagrammatic showing of a hydraulic power transmission circuit incorporating a preferred form of the present invention.

There is illustrated in the drawing a pump 10 of any suitable construction, preferably of the constant displacement type, and driven by a suitable prime mover such as an electric motor 12. The pump has a suction conduit 14 through which oil is withdrawn from a tank 16 and delivered to a discharge conduit 18 in which a conventional relief valve 20 is incorporated.

The delivery conduit 18 has two branches 22 and 24 each of which leads to a fluid motor 26 and 28 respectively. The motors may be of any suitable constant displacement type and are provided with self-contained worm-type speed reducers for delivering power from a motor output shaft 30 to a transverse load driving shaft 32. The shafts 32 are connected each to one section of the machine to be driven, and for purposes of illustration there is shown a gyratory screen 34 driven from the shaft 32 of motor 26 and a belt-type conveyor 36 driven from the shaft 32 of motor 28. It will be understood that these are representative of but two of the many types of load devices which may be driven from the motors 26 and 28.

The outlets of motors 26 and 28 are connected to conduits 38 and 40 which lead to selector valves 42 and 44 respectively. The latter have shiftable spools 46 and 48 by which the conduits 38 and 40 may be selectively connected either with conduits 50 and 52 leading to the tank or with conduits 54 and 56 leading to a second pair of fluid motors 58 and 60 respectively. The outlets of motors 58 and 60 are connected directly to the tank conduits 50 and 52 by branch conduits 62 and 64. The motors 58 and 60 may be connected to drive any suitable load device such as the conveyors indicated diagrammatically at 66 and 68. The shafts of motors 26 and 28 are each connected by couplings 70 and 72 to a shaft 74 which forms a rigid mechanical connection between the two motors 26 and 28. On the shaft there is mounted a flywheel 76 forming an energy storing reservoir which is available to be drawn on by either of the motors 26 or 28.

In operation, with the valves 42 and 44 in the positions illustrated in the drawing, the motor 12 may be started up driving the pump 10 to deliver oil through conduits 22 and 24 to the motors 26 and 28. The latter accordingly rotate at a predetermined speed in relation to the speed of the pump 10 and discharge oil through the conduits 38 and 40, valves 42 and 44, and conduits 50 and 52 to tank.

Under these conditions the shaft 74 causes the two motors 26 and 28 to rotate at the same speed so that, if the motors have the same cubical displacement per revolution, the flow delivered by the pump will be equally divided between conduits 22 and 24. If the displacements of the motors are not equal, this flow will be divided in proportion to the ratio between the two motor displacements. Since both motors 26 and 28 must operate at the same pressure differential due to the parallel connection between the pump discharge line 18 and the tank, it follows that the power delivered to either motor may be either partially or wholly utilized in driving its respective load device and that if it is only partially utilized the shaft 74 transmits the remaining portion of the power to the load device of the other motor.

With the two motors 26 and 28 thus operating, if the valve 42, for example, be shifted to connect conduit 38 with conduit 54, it will be seen that the motor 58 will be started and that the conveyor 66 will accordingly be driven. During the starting period of this motor the high starting load of the conveyor 66 will produce a high pressure in the conduits 54 and 38 thus imposing a back pressure on the motor 26. The energy stored in the flywheel 76, however, is now available to be delivered through shaft 74 and shaft 30 of motor 26 and to thus tend to drive the motor 26 at a lower pressure differential than would be required if the flywheel 76 were not available. Thus a portion of the energy stored in the flywheel is utilized in delivering oil from the outlet of motor 26 against the high back pressure in conduit 38 without requiring a rise in pressure in the pump delivery line 18 sufficiently high to overcome both the load imposed by the screen 34 and that imposed by the conveyor 66. Thus the conveyor 66 may be started without overloading the pump 10.

As soon as the conveyor is brought up to speed which takes place in a small interval of time, the driving load thereof falls to its normal value at which the pump 10 is not overloaded by driving both motors 26 and 58 in series. The conveyor 68 may be placed in operation in a manner similar to that of the conveyor 66 by shifting the valve 44 so as to connect to conduits 40 and 56. Under these conditions the flywheel 76 is also available to assist in overcoming the starting load without overloading the pump 10.

It will be seen that as the relative loads on the different fluid motors vary that a heavily loaded motor may be assisted by a lightly loaded one so long as the total load on the system is not sufficient to overload the pump 10. Thus, if, under certain conditions, the conveyor 68 imposes a relatively light load on the motor 60, the back pressure against which the motor 28 operates is reduced, thus increasing the pressure differential across that motor so that a greater torque may be delivered to the shaft 30 of motor 28. This torque is available either to drive the conveyor 36 directly if the load thereon is heavy, or it may be transmitted through shaft 74 to the shaft 30 of motor 26 and utilized in overcoming excess load on the screen 34. Likewise, if screen 34 is not excessively loaded, this excess torque may be converted to fluid pressure energy and delivered from the outlet at motor 26 through conduits 38 and 54 to the motor 58 if the conveyor 66 should be heavily loaded. In this way the total power available at the pump 10 is delivered to each of the fluid motors in whatever proportion their respective loads demand while maintaining a predetermined speed relation between all of the motors in the system. It will be obvious that a greater number of motors than the four illustrated may be utilized by connecting similar pairs of series-connected motors into the system for operation from the pump delivery conduit 18 with the shaft of one motor mechanically connected to the shaft 74 in a suitable manner.

While the form of embodiment of the invention as herein disclosed constitutes a preferred form, it is to be understood that other forms might be adopted, all coming within the scope of the claims which follow.

What is claimed is as follows:

1. In a fluid power transmission system the combination of pump means forming a source of pressure fluid, a pair of fluid motors hydraulically connected to the source and mechanically connected together, a third fluid motor hydraulically connected in series with one of the pair of motors, and separate load devices, one mechanically connected to each motor respectively to be driven thereby in predetermined speed relation with mutual interchange of load.

2. In a fluid power transmission system the combination of pump means forming a source of pressure fluid, a pair of fluid motors hydraulically connected to the source and mechanically connected together, means forming an inertia element mechanically connected with said motors, a third fluid motor hydraulically connected in series with one of the pair of motors, and separate load devices, one mechanically connected to each motor respectively to be driven thereby in predetermined speed relation with mutual interchange of load, said inertia element serving as an energy reservoir to be drawn on by any one of the motors when its load device would otherwise overload the system momentarily.

3. In a fluid power transmission system the combination of pump means forming a source of pressure fluid, two fluid motor circuits hydraulically connected to said source, each circuit including a plurality of fluid motors connected in series with each other, each motor being connected to a separate load device, and means forming a mechanical connection between one motor of each circuit and serving to transfer power from one circuit to the other when the loads in the two circuits are unequal.

4. In a fluid power transmission system the combination of pump means forming a source of pressure fluid, two fluid motor circuits hydraulically connected to said source, each circuit including a plurality of fluid motors connected in series with each other and each driving a separate load, means forming a mechanical connection between one motor of each circuit and serving to transfer power from one circuit to the other when the loads in the two circuits are unequal, and a flywheel associated with said connection to store energy for driving any motor which is abnormally loaded.

5. In a fluid power transmission system the combination of a pump forming a single source of pressure fluid, a first group of fluid motors hydraulically connected in parallel to said source and each respectively connected in driving relation to a separate load device, a second group of fluid motors of the rotary type each hydraulically connected in series with one motor respectively of the first group, and means forming a mechanical connection between the motors of the first group whereby the motors of the second group will be driven at a fixed speed ratio relative to one another independently of load variations.

6. In a fluid power transmission system the combination of a pump forming a single source of pressure fluid, a first group of fluid motors hydraulically connected in parallel to said source and each respectively connected in driving relation to a separate load device, a second group of fluid motors of the rotary type each hydraulically connected in series with one motor respectively of the first group, means forming a mechanical connection between the motors of the first group whereby the motors of the second group will be driven at a fixed speed ratio relative to one another independently of load variations, and a flywheel associated with said mechanical connection forming an energy reservoir available to each motor of the first group.

L RAYMOND TWYMAN.